United States Patent
Kang et al.

(10) Patent No.: US 10,599,253 B2
(45) Date of Patent: Mar. 24, 2020

(54) TOUCH SCREEN PANEL

(71) Applicant: Samsung Display Co., Ltd., Yongin-si, Gyeonggi-do (KR)

(72) Inventors: Sung-Ku Kang, Yongin-si (KR); Mi-Ae Park, Yongin-si (KR); Kwan-Young Han, Yongin-si (KR); Tae-Hyeog Jung, Yongin-si (KR); Mikiya Itakura, Yongin-si (KR)

(73) Assignee: Samsung Dosplay Co., Ltd., Yongin-si (KR)

( * ) Notice: Subject to any disclaimer, the term of this patent is extended or adjusted under 35 U.S.C. 154(b) by 51 days.

(21) Appl. No.: 15/682,355

(22) Filed: Aug. 21, 2017

(65) Prior Publication Data

US 2017/0351376 A1    Dec. 7, 2017

Related U.S. Application Data

(63) Continuation of application No. 14/846,500, filed on Sep. 4, 2015, now Pat. No. 9,791,964, which is a
(Continued)

(30) Foreign Application Priority Data

Jun. 30, 2011 (KR) .......................... 10-2011-0064432

(51) Int. Cl.
*G06F 3/045* (2006.01)
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04102* (2013.01)

(58) Field of Classification Search
CPC .................. G06F 3/044; G06F 3/0488; G06F 2203/04102
See application file for complete search history.

(56) References Cited

U.S. PATENT DOCUMENTS 7,833,588 B2    11/2010    Mikoshiba et al.
8,345,021 B2    1/2013    Jung et al.
(Continued)

FOREIGN PATENT DOCUMENTS

CA    2 772 040 A1    3/2011
CN    102043184 A    5/2011
(Continued)

OTHER PUBLICATIONS

Partial English translation of relevant parts of CN 102043184 A dated May 4, 2011, listed above (2 pages).
(Continued)

*Primary Examiner* — Lixi C Simpson
(74) *Attorney, Agent, or Firm* — Lewis Roca Rothgerber Christie LLP

(57) ABSTRACT

A touch screen panel includes a thin film substrate having sensing patterns formed thereon that is implemented as an isotropic film, and a polarizing plate is disposed on the sensing patterns so that it is possible to minimize or reduce degradation of image quality. The touch screen panel includes a thin film substrate, sensing patterns, and sensing lines. The thin film substrate is divided into an active area and a non-active area. The sensing patterns are formed in the active area of the thin film substrate. The sensing lines are formed in the non-active area of the thin film substrate so as to be connected to the sensing patterns. In the touch screen panel, the thin film substrate is implemented as an isotropic film.

30 Claims, 3 Drawing Sheets

Related U.S. Application Data continuation of application No. 13/238,970, filed on Sep. 21, 2011, now Pat. No. 9,128,569.

(56) References Cited

U.S. PATENT DOCUMENTS

| | | |
|---|---|---|
| 8,599,149 B2 | 12/2013 | Lee et al. |
| 8,605,038 B2 | 12/2013 | Cho |
| 8,797,467 B2 | 8/2014 | Jung et al. |
| 9,128,569 B2 | 9/2015 | Kang et al. |
| 9,400,576 B2 | 7/2016 | Chen et al. |
| 2006/0152640 A1* | 7/2006 | Tanabe ............... G02F 1/13338 349/12 |
| 2008/0138589 A1 | 6/2008 | Wakabayashi et al. |
| 2009/0160819 A1 | 6/2009 | Sasaki et al. |
| 2009/0179871 A1 | 7/2009 | Tatehata et al. |
| 2009/0213090 A1 | 8/2009 | Mamba et al. |
| 2009/0244024 A1 | 10/2009 | Kurahashi |
| 2010/0006347 A1 | 1/2010 | Yang |
| 2010/0007616 A1 | 1/2010 | Jang |
| 2010/0066702 A1* | 3/2010 | Lee ......................... G06F 3/044 345/174 |
| 2010/0110040 A1 | 5/2010 | Kim et al. |
| 2010/0182274 A1 | 7/2010 | Kang et al. |
| 2010/0207891 A1 | 8/2010 | Wang |
| 2010/0220076 A1 | 9/2010 | Nagata et al. |
| 2010/0310863 A1* | 12/2010 | Kuchiyama ........... C23C 14/086 428/336 |
| 2011/0032193 A1* | 2/2011 | Szalkowski ............ G06F 3/044 345/173 |
| 2011/0050648 A1 | 3/2011 | Lee et al. |
| 2011/0080372 A1 | 4/2011 | Lee et al. |
| 2011/0109583 A1 | 5/2011 | Lee |
| 2011/0115725 A1 | 5/2011 | Hwang et al. |
| 2011/0187672 A1* | 8/2011 | Hung ..................... G06F 3/044 345/174 |
| 2011/0242655 A1 | 10/2011 | Jung et al. |
| 2012/0073947 A1 | 3/2012 | Sakata et al. |
| 2012/0113014 A1 | 5/2012 | Yilmaz |
| 2012/0113361 A1 | 5/2012 | Huang et al. |
| 2012/0127112 A1* | 5/2012 | Lu ........................... G06F 3/044 345/174 |
| 2012/0241199 A1 | 9/2012 | Kobayashi et al. |
| 2014/0079927 A1* | 3/2014 | Yoshioka ............... C23C 14/086 428/213 |
| 2016/0306468 A1 | 10/2016 | Chen et al. |

FOREIGN PATENT DOCUMENTS

| | | | |
|---|---|---|---|
| EP | 1 870 799 B1 | 5/2012 | |
| JP | 2001-117069 A | 4/2001 | |
| JP | 2007-234025 A | 9/2007 | |
| JP | 2007-243059 | 9/2007 | |
| JP | 2008-98169 | 4/2008 | |
| JP | 2009-512091 A | 3/2009 | |
| JP | 2010-72584 A | 4/2010 | |
| JP | 2010-208169 A | 9/2010 | |
| JP | 2011-113149 | 6/2011 | |
| KR | 1020070054661 A | 5/2007 | |
| KR | 10-2010-0007717 | 1/2010 | |
| KR | 1020100084252 A | 7/2010 | |
| KR | 1020100084258 A | 7/2010 | |
| KR | 10-2010-0104463 A | 9/2010 | |
| KR | 10-2011-0039182 A | 4/2011 | |
| TW | 200717068 | 5/2007 | |
| TW | 201023129 A1 | 6/2010 | |
| TW | 201120519 | 6/2011 | |
| WO | WO 2006/126604 A1 | 11/2006 | |
| WO | WO 2010/024192 A1 | 3/2010 | |
| WO | WO 2011/002849 A1 | 1/2011 | |
| WO | WO-2011002849 A1 * | 1/2011 | ......... G06F 3/03547 |
| WO | WO 2011/046389 A2 | 4/2011 | |
| WO | WO 2011/070801 A1 | 6/2011 | |
| WO | WO 2010/095797 A1 | 8/2016 | |

OTHER PUBLICATIONS

EPO Search Report dated Mar. 26, 2013, for corresponding European Patent application 11186786.7, (7 pages).

EPO Office action dated Oct. 15, 2013, for corresponding European Patent application 11186786.7, (8 pages).

JPO Office action dated Sep. 15, 2015, for corresponding Japanese Patent application 2011-212624, (3 pages).

JPO Office action dated Apr. 5, 2016, for corresponding Japanese Patent application 2011-212624, (2 pages).

Korean Office action dated Aug. 28, 2013 issued to corresponding Korean priority application No. 10-2011-0064432, 4 pages.

Notice of Allowance dated Mar. 27, 2014 issued in Korean priority application No. 10-2011-0064432, 1 page.

SIPO Office Action dated Sep. 29, 2016, with English translation, for corresponding Chinese Patent Application No. 201110405575.8 (11 pages).

Taiwan Office action dated Aug. 13, 2015, with English translation, for corresponding Taiwanese Patent application 100136378, (11 pages).

Taiwanese Office action dated Feb. 19, 2016, for Taiwan Patent application 100136378, (5 pages).

English translation of lines 4-6 of p. 8 of Taiwan Publication 200717068 dated May 1, 2007, (1 page).

* cited by examiner

TOUCH SCREEN PANEL

CROSS-REFERENCE TO RELATED APPLICATION

This application is a continuation of U.S. patent application Ser. No. 14/846,500, filed Sep. 4, 2015, which is a continuation of U.S. patent application Ser. No. 13/238,970, filed Sep. 21, 2011, now U.S. Pat. No. 9,128,569, which claims priority to and the benefit of Korean Patent Application No. 10-2011-0064432, filed Jun. 30, 2011, the entire contents of all of which are incorporated herein by reference.

BACKGROUND

1. Field

An aspect of the present invention relates to a touch screen panel, and particularly to a touch screen panel for an image display device or the like.

2. Description of Related Art

A touch screen panel is an input device that allows a user's instruction to be inputted by selecting an instruction content displayed on a screen of an image display device or the like with a user's hand or an object.

To this end, the touch screen panel is formed on a front face of the image display device to convert a contact position into an electrical signal. Here, the user's hand or the object is directly in contact with the touch screen panel at the contact position. Accordingly, the instruction content selected at the contact position is inputted as an input signal to the image display device.

Since such a touch screen panel can replace a separate input device, such as a keyboard or a mouse, connected to an image display device, its application fields have been gradually extended.

Touch screen panels are divided into resistive overlay touch screen panels, photosensitive touch screen panels, capacitive touch screen panels, and the like.

Among these touch screen panels, the capacitive touch screen panel converts a contact position into an electrical signal by sensing a change in capacitance formed between a conductive sensing pattern and an adjacent sensing pattern, a ground electrode or the like when a user's hand or an object is in contact with the touch screen panel.

Generally, such a touch screen panel is frequently attached to an outer face of a flat panel display device such as a liquid crystal display device or an organic light emitting display device. Therefore, the touch screen panel requires characteristics of high transparency and thin thickness.

SUMMARY

Embodiments of the present invention are directed toward a touch screen panel in which sensing patterns are formed as touch sensors on a thin film substrate, so that it is possible to implement the touch screen panel with a thin or reduced thickness.

Embodiments of the present invention are also directed toward a touch screen panel in which a thin film substrate having sensing patterns formed thereon is implemented as an isotropic film, and a polarizing plate is disposed on the sensing patterns, so that it is possible to minimize or reduce degradation of image quality due to the exposure of the sensing patterns.

According to an embodiment of the present invention, there is provided a touch screen panel including: a thin film substrate divided into an active area and a non-active area; sensing patterns at the active area of the thin film substrate; and sensing lines at the non-active area of the thin film substrate, the sensing lines connected to the sensing patterns, wherein the thin film substrate includes an isotropic film.

The isotropic film may include one of cyclic polyolefin (COP), non-stretched polycarbonate, or triacetylcelluose (TAC). The thickness of the thin film substrate may be between about 0.02 mm and about 0.2 mm.

The touch screen panel may further include a polarizing plate on the sensing patterns; and a window substrate on the polarizing plate.

The sensing patterns may include first and second sensing cells alternately arranged so as not to overlap with each other. The first and second sensing patterns may be located at different layers from each other.

The sensing patterns may include first sensing cells connected to one another along a first direction on a first surface of the thin film substrate; first connection lines each connected between adjacent ones of the first sensing cells; second sensing cells connected to one another along a second direction on a second surface of the thin film substrate; and second connection lines each connected between adjacent ones of the second sensing cells.

The thin film substrate may have a stacked structure including first and second thin film substrates. The sensing patterns may include first sensing cells connected to one another along the first direction on a surface of the first thin film substrate; first connection lines each connected between adjacent ones of the first sensing cells; second sensing cells connected to one another along the second direction on a surface of the second thin film substrate; and second connection lines each connected between adjacent ones of the second sensing cells.

As described above, according to the embodiments of the present invention, a touch screen panel is implemented to have the form of a thin film that does not require retardation compensation, and the touch screen panel is attached between a top surface of a display device and a polarizing plate, so that it is possible to minimize or reduce an increase in thickness and to implement low reflection, high image quality, and the like.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE EMBODIMENTS

Figure 1:
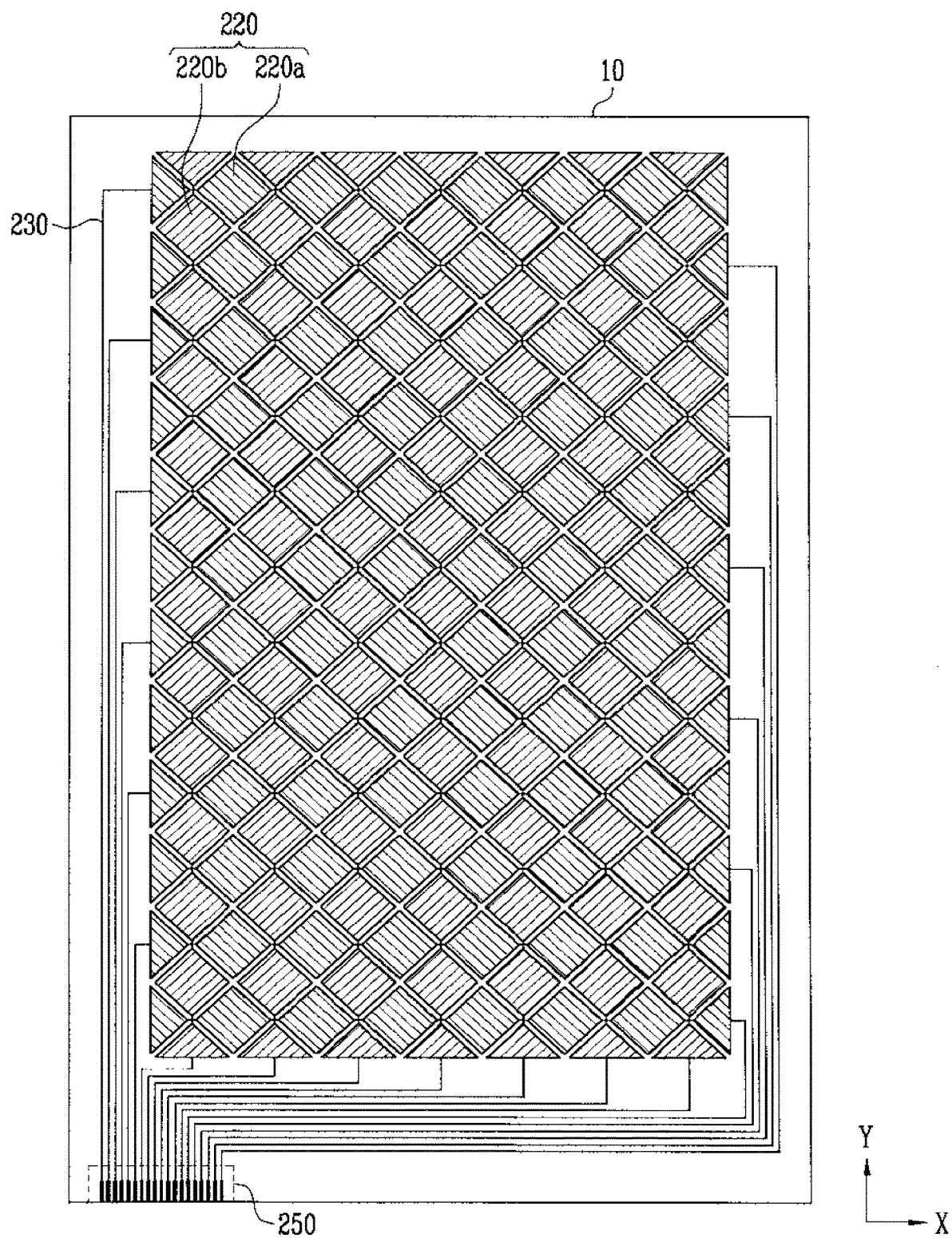
FIG. 1 is a plan view schematically showing a touch screen panel according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" or "coupled to" another element, it can be directly connected to the another element or be indirectly connected to the another element with one or more intervening elements interposed therebetween. Hereinafter, like reference numerals refer to like elements.

Hereinafter, exemplary embodiments of the present invention will be described in detail with reference to the accompanying drawings.

Figure 2:
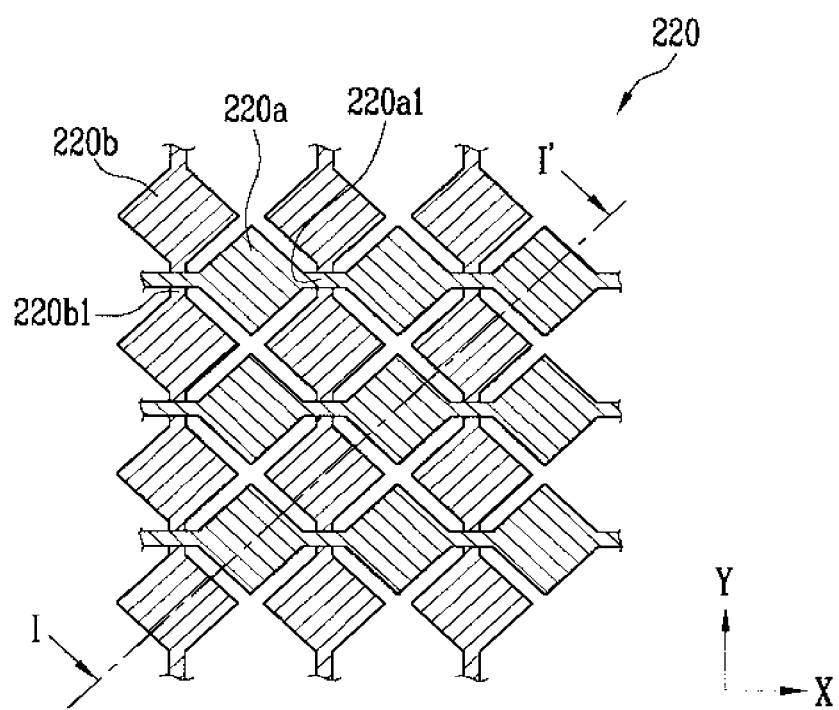
FIG. 2 is an enlarged view showing an example of sensing patterns shown in FIG. 1.

FIG. 1 is a plan view schematically showing a touch screen panel according to an embodiment of the present invention. FIG. 2 is an enlarged view showing an example of sensing patterns shown in FIG. 1.

Referring to FIGS. 1 and 2, the touch screen panel includes a thin film substrate 10, sensing patterns 220 formed on at least one surface of the thin film substrate 10, and sensing lines 230 for connecting the sensing patterns 220 to an external driving circuit (not shown) through a pad portion 250.

The thin film substrate 10 is generally formed of a transparent material having properties of high heat resistance and chemical resistance. In this embodiment, an isotropic film is used as the thin film substrate 10. In an embodiment, the isotropic film may be formed of one of cyclic polyolefin (COP), non-stretched polycarbonate, or triacetylcelluose (TAC).

That is, the touch screen panel according to this embodiment does not use existing rigid materials (e.g., glass, polyester (PET), and the like) as the substrate, but uses an isotropic film as the thin film substrate. Thus, it is possible to implement a touch screen panel with a thin thickness. Accordingly, it is possible to ensure a flexible characteristic.

In an embodiment, the thickness of the thin film substrate 10 may be between about 0.02 mm and about 0.2 mm.

In a comparative example, PET among the existing materials used as the substrate of the touch screen panel is prepared through a stretching process, and hence the retardation value of the PET is large (about 1000 nm or more) and unequal. Therefore, the PET does not satisfy polarized optical conditions. However, in an embodiment of the present invention, the isotropic film is used as the thin film substrate, so that it is possible to overcome such a disadvantage.

That is, in the case of the isotropic film, its physical property such as a refractive index has the same characteristic in any direction, and hence it is possible to avoid a problem caused by the isotropic characteristic of the PET prepared through the stretching process.

The configuration of the touch screen panel according to an embodiment of the present invention will be described as follows.

As shown in FIG. 2, the sensing patterns 220 include first sensing cells 220a formed to be connected to one another for each first line along a first direction (e.g., an X-axis direction), first connection lines 220a1 that connect the first sensing cells 220a along the first direction, second sensing cells 220b formed to be connected to one another for each second line along a second direction (e.g., a Y-axis direction), and second connection lines 220b1 that connect the second sensing cells 220b along the second direction.

For convenience of illustration, only some of the sensing patterns are shown in FIG. 2. However, the touch screen panel has a structure in which the sensing patterns shown in FIG. 2 are repeatedly arranged.

The first and second sensing cells 220a and 220b are arranged not to be overlapped with each other, and the first and second connection lines 220a1 and 220b1 cross with each other.

Here, the first and second sensing cells 220a and 220b are formed of a transparent electrode material such as indium tin oxide (hereinafter, referred to as ITO). The first and second sensing cells 220a and 220b are integrally formed with the first and second connection lines 220a1 and 220b1, respectively.

That is, in this embodiment, the first sensing cells 220a and the first connection lines 220a1 are formed at a layer that is different from another layer where the second sensing cells 220b and the second connection lines 220b1 are formed.

The sensing lines 230 shown in FIG. 1 are electrically connected to the first lines of the first sensing cells 220a and the second lines of the second sensing cells 220b, respectively, so as to connect them to an external driving circuit (not shown) such as a position detecting circuit through the pad portion 250.

The sensing lines 230 are disposed in a non-active area outside of an active area in which an image is displayed. Since the material of the sensing lines 230 may be selected from a wide range of materials, the sensing lines 230 may be formed of not only a transparent electrode material used to form the sensing patterns 220, but also a low-resistance metallic material such as molybdenum (Mo), silver (Ag), titanium (Ti), copper (Cu), aluminum (Al), or Mo/Al/Mo.

The touch screen panel according to this embodiment is a capacitive touch screen panel. If a contact object such as a user's finger or a stylus pen comes in contact with the touch screen panel, a change in capacitance at a contact position is transferred from the sensing patterns 220 to the driving circuit (not shown) via the sensing lines 230 and the pad portion 250. Then, the change in capacitance is converted into an electrical signal by suitable circuits such as X and Y input processing circuits (not shown), thereby detecting the contact position.

As shown in FIG. 2, the first and second sensing cells 220a and 220b of the touch screen panel according to this embodiment are formed in different layers from each other. This can be implemented to have a structure of FIG. 3A or 3B as will be more specifically described below.

Figure 3A:
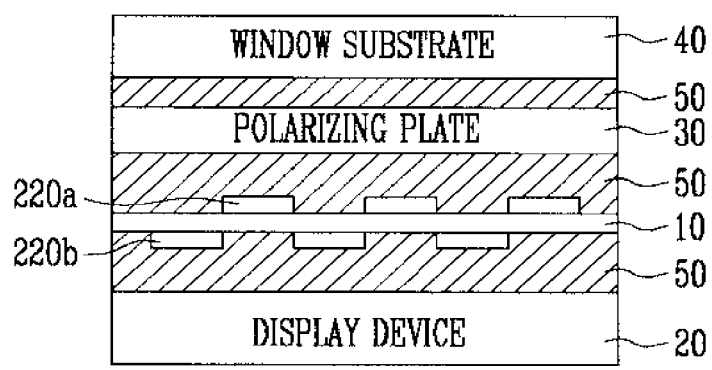
FIGS. 3A and 3B are cross-sectional views showing an area of the touch screen panel along the line I-I' according to an embodiment of the present invention.
Figure 3B:
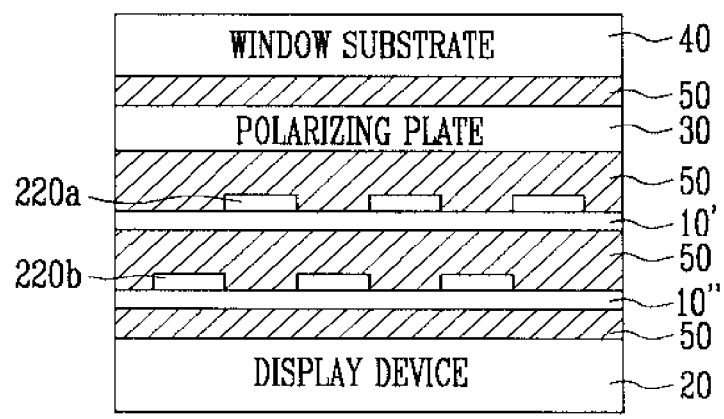

FIGS. 3A and 3B are cross-sectional views showing an area of the touch screen panel of FIG. 2 along the line I-I' according to an embodiment of the present invention.

A structure in which a display device 20 is attached to a second surface of the touch screen panel is shown in FIGS. 3A and 3B.

In an embodiment, the display device 20 may be implemented as a flat panel display device, particularly an organic light emitting display device having a flexible characteristic. However, the display device 20 according to this embodiment is not necessarily limited to the flexible display device.

Referring to FIG. 3A, the first sensing cells 220a that constitute the touch screen panel are formed on a first surface of the thin film substrate 10, and the second sensing cells 220b that constitute the touch screen panel are formed on a second surface of the thin film substrate 10.

That is, in the embodiment shown in FIG. 3A, both surfaces of the same thin film substrate 10 are used so that the first and second sensing cells 220a and 220b are formed in different layers from each other.

Although not shown in FIG. 3A, the structure in which the first and second connection lines 220a1 and 220b1 that connect the first and second sensing cells 220a and 220b are formed on the same surfaces as the first and second sensing cells 220a and 220b, respectively, is identical to that shown in FIG. 2.

In the embodiment shown in FIG. 3A, the thin film substrate 10 is an isotropic film, and may be formed of one of COP, non-stretched polycarbonate, or TAC.

When the touch screen panel is attached to a top surface of the display device 20, a polarizing plate 30 is further provided to an upper surface of the touch screen panel so as to prevent exposure of the sensing cells 220a and 220b and to improve reflection characteristics.

That is, in the embodiment of FIG. 3A, the touch screen panel is positioned between the display device 20 and the polarizing plate 30, so that it is possible to prevent exposure of the sensing patterns and to minimize reflection.

In addition, a window substrate 40 is further provided to a top surface of the polarizing plate 30 so as to enhance the strength of the device.

Since the display device 20 and the touch screen panel may have the flexible characteristic as described above, the window substrate 40 may also be formed of a material having a flexible characteristic.

Thus, in an embodiment, the window substrate 40 may be formed of a material such as polymethyl methacrylate (PMMA), acryl, or polyester (PET). The thickness of the window substrate 40 may be about 0.7 mm.

However, in a case where the display device 20 is implemented as a non-flexible flat panel display, the window substrate 40 does not necessarily have the flexible characteristic. Thus, a glass substrate may be used as the window substrate 40 to improve the strength of the device.

The layers shown in FIG. 3A, i.e., the display device 20, the thin film substrate 10 having the first and second sensing cells 220a and 220b formed thereon, the polarizing plate 30, and the window substrate 40 are attached to one another by transparent adhesive layers 50 respectively interposed between the layers. The transparent adhesive layer 50 is a transparent adhesive material having high optical transmittance, and may be made of a super view resin (SVR), an optically clear adhesive (OCA), or the like.

Although the thicknesses of the components such as the sensing cells 220a and 220b that constitute the touch screen panel are exaggerated in FIG. 3A, this is done for convenience of illustration. Practically, the thickness of each of the components is much thinner than that shown in FIG. 3A.

Referring to the embodiment of FIG. 3B, the first sensing cells 220a that constitute the touch screen panel are formed on a first thin film substrate 10', and the second sensing cells 220b that constitute the touch screen panel are formed on a second thin film substrate 10" positioned below the first thin film substrate 10'.

In an embodiment, the positions of the first and second thin film substrates 10' and 10" may be reversed to each other.

That is, in the embodiment shown in FIG. 3B, the different thin film substrates 10' and 10" are used so that the first and second sensing cells 220a and 220b are formed in different layers from each other. The first and second thin film substrates 10' and 10" are isotropic films, and may be formed of one of COP, non-stretched polycarbonate, or TAC.

Since the structure and arrangement of other components in FIG. 3B are substantially identical to those described in the embodiment of FIG. 3A, components identical to those of FIG. 3A are designated by like reference numerals, and their detailed descriptions will be omitted.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A display device comprising:
   a flexible thin film substrate having a first surface and a second surface opposite the first surface;
   a sensing pattern on at least one surface of the first and second surfaces of the flexible thin film substrate;
   a polarizing plate over the flexible thin film substrate;
   a first adhesive layer interposed between the first surface of the flexible thin film substrate and the polarizing plate, over an entirety of the first surface of the flexible thin film substrate, and contacting an entirety of a surface of the polarizing plate;
   a flexible display device under the flexible thin film substrate; and
   a second adhesive layer interposed between the second surface of the flexible thin film substrate and the flexible display device,
   wherein the flexible thin film substrate comprises polycarbonate or cyclic polyolefin, and
   wherein the first adhesive layer contacts the sensing pattern on the first surface of the flexible thin film substrate and an exposed portion of the first surface of the flexible thin film substrate.

2. The display device according to claim 1, further comprising a window substrate on the polarizing plate.

3. The display device according to claim 1, wherein a thickness of the flexible thin film substrate is between about 0.02 mm and about 0.2 mm.

4. The display device according to claim 1, wherein a retardation value of the flexible thin film substrate is less than 1000 nm.

5. The display device according to claim 1, wherein the flexible display device is a flexible organic light emitting display device.

6. A display device comprising:
   a flexible thin film substrate having a first surface and a second surface opposite the first surface;
   a sensing pattern on at least one surface of the first and second surfaces of the flexible thin film substrate;
   a polarizing plate over the flexible thin film substrate;
   a first adhesive layer interposed between the first surface of the flexible thin film substrate and the polarizing plate, over an entirety of the first surface of the flexible thin film substrate, and contacting an entirety of the polarizing plate;
   a flexible display device under the flexible thin film substrate; and
   a second adhesive layer interposed between the second surface of the flexible thin film substrate and the flexible display device,
   wherein a thickness of the flexible thin film substrate is between about 0.02 mm and about 0.2 mm, and
   wherein the first adhesive layer contacts the sensing pattern on the first surface of the flexible thin film substrate and an exposed portion of the first surface of the flexible thin film substrate.

7. The display device according to claim 6, wherein the flexible thin film substrate comprises polycarbonate or cyclic polyolefin.

8. The display device according to claim 6, wherein a retardation value of the flexible thin film substrate is less than 1000 nm.

9. The display device according to claim 6, wherein the flexible display device is a flexible organic light emitting display device.

10. The display device according to claim 6, further comprising a window substrate on the polarizing plate.

11. A display device comprising:
a flexible thin film substrate having a first surface and a second surface opposite the first surface;
a sensing pattern on at least one surface of the first and second surfaces of the flexible thin film substrate;
a polarizing plate over the flexible thin film substrate;
a first adhesive layer interposed between the first surface of the flexible thin film substrate and the polarizing plate, over an entirety of the first surface of the flexible thin film substrate, and contacting an entirety of the polarizing plate;
a flexible display device under the flexible thin film substrate; and
a second adhesive layer interposed between the second surface of the flexible thin film substrate and the flexible display device,
wherein a retardation value of the flexible thin film substrate is less than 1000 nm, and
wherein the first adhesive layer contacts the sensing pattern on the first surface of the flexible thin film substrate and an exposed portion of the first surface of the flexible thin film substrate.

12. The display device according to claim 11, wherein the flexible thin film substrate comprises polycarbonate or cyclic polyolefin.

13. The display device according to claim 11, wherein a thickness of the flexible thin film substrate is between about 0.02 mm and about 0.2 mm.

14. The display device according to claim 11, further comprising a window substrate on the polarizing plate.

15. The display device according to claim 11, wherein the flexible display device is a flexible organic light emitting display device.

16. An image display device, comprising:
a flexible display device;
a flexible touch screen panel comprising a flexible thin film substrate, and sensing patterns on the flexible thin film substrate;
an adhesive layer on the flexible touch screen panel; and
a polarizing plate on the adhesive layer,
wherein the flexible thin film substrate is made of an isotropic film,
wherein the adhesive layer is over an entirety of the flexible touch screen panel, and contacts an entirety of the polarizing plate, and
wherein the adhesive layer contacts the sensing patterns and an exposed portion of a surface of the flexible thin film substrate.

17. The image display device according to claim 16, wherein the flexible thin film substrate comprises polycarbonate or cyclic polyolefin.

18. The image display device according to claim 16, wherein a thickness of the flexible thin film substrate is between about 0.02 mm and about 0.2 mm.

19. The image display device according to claim 16, further comprising a window substrate on the polarizing plate.

20. The image display device according to claim 16, wherein the flexible display device is a flexible organic light emitting display device.

21. The image display device according to claim 16, wherein a retardation value of the flexible thin film substrate is less than 1000 nm.

22. A touch screen panel comprising:
a flexible thin film substrate;
sensing patterns on the flexible thin film substrate;
a polarizing plate over the flexible thin film substrate; and
an adhesive layer interposed between the flexible thin film substrate and the polarizing plate, over an entirety of the flexible thin film substrate, and contacting an entirety of the polarizing plate,
wherein the flexible thin film substrate comprises polycarbonate or cyclic polyolefin, and wherein a thickness of the flexible thin film substrate is between about 0.02 mm and about 0.2 mm,
wherein the sensing patterns are disposed between the flexible thin film substrate and the polarizing plate, and
wherein the adhesive layer contacts the sensing patterns and an exposed portion of a surface of the flexible thin film substrate.

23. The touch screen panel according to claim 22, wherein a retardation value of the flexible thin film substrate is less than 1000 nm.

24. The touch screen panel according to claim 22, wherein the flexible thin film substrate is made of an isotropic film.

25. A touch screen panel comprising:
a flexible thin film substrate;
sensing patterns on the flexible thin film substrate;
a polarizing plate over the flexible thin film substrate; and
an adhesive layer interposed between the flexible thin film substrate and the polarizing plate, over an entirety of the flexible thin film substrate, and contacting an entirety of the polarizing plate,
wherein a thickness of the flexible thin film substrate is between about 0.02 mm and about 0.2 mm,
wherein the sensing patterns are disposed between the flexible thin film substrate and the polarizing plate,
wherein a retardation value of the flexible thin film substrate is less than 1000 nm,
wherein the flexible thin film substrate is made of an isotropic film, and
wherein the adhesive layer contacts the sensing patterns and an exposed portion of a surface of the flexible thin film substrate.

26. A touch screen panel comprising:
a flexible thin film substrate;
sensing patterns on the flexible thin film substrate;
a polarizing plate over the flexible thin film substrate; and
an adhesive layer interposed between the flexible thin film substrate and the polarizing plate, over an entirety of the flexible thin film substrate, and contacting an entirety of the polarizing plate,
wherein a thickness of the flexible thin film substrate is between about 0.02 mm and about 0.2 mm,
wherein the sensing patterns are disposed between the flexible thin film substrate and the polarizing plate, and
wherein the adhesive layer contacts the sensing patterns and an exposed portion of a surface of the flexible thin film substrate.

27. A touch screen panel comprising:
a flexible thin film substrate;

sensing patterns on the flexible thin film substrate;
a polarizing plate over the flexible thin film substrate; and
an adhesive layer over an entirety of the flexible thin film substrate, and contacting an entirety of the polarizing plate,
wherein the flexible thin film substrate comprises polycarbonate or cyclic polyolefin,
wherein a thickness of the flexible thin film substrate is between about 0.02 mm and about 0.2 mm, and
wherein the adhesive layer contacts the sensing patterns and an exposed portion of a surface of the flexible thin film substrate.

28. The touch screen panel according to claim 27, wherein a retardation value of the flexible thin film substrate is less than 1000 nm.

29. The touch screen panel according to claim 27, wherein the flexible thin film substrate is made of an isotropic film.

30. The touch screen panel according to claim 27, wherein the flexible thin film substrate is made of a non-stretched film.

* * * * *